United States Patent
Lin et al.

(10) Patent No.: US 11,644,078 B2
(45) Date of Patent: May 9, 2023

(54) SHOCK ISOLATION CUSHION

(71) Applicants: Qing-Rui Lin, Kaohsiung (TW);
Su-Chen Cheng, Kaohsiung (TW)

(72) Inventors: Qing-Rui Lin, Kaohsiung (TW);
Su-Chen Cheng, Kaohsiung (TW)

(73) Assignees: Royal Su, Kaohsiung (TW); Jui-Sheng Sun, New Taipei (TW)

( * ) Notice: Subject to any disclaimer, the term of this patent is extended or adjusted under 35 U.S.C. 154(b) by 0 days.

(21) Appl. No.: 17/406,637

(22) Filed: Aug. 19, 2021

(65) Prior Publication Data
US 2022/0325769 A1    Oct. 13, 2022

(30) Foreign Application Priority Data
Apr. 9, 2021 (TW) .................................. 110112868

(51) Int. Cl.
*F16F 3/08* (2006.01)
*F16F 3/087* (2006.01)

(52) U.S. Cl.
CPC ........ *F16F 3/0876* (2013.01); *F16F 2236/04* (2013.01)

(58) Field of Classification Search
CPC ....... F16F 3/087; F16F 3/0876; F16F 2236/04
USPC ................................................ 267/165, 144
See application file for complete search history.

(56) References Cited

U.S. PATENT DOCUMENTS

| | | | | |
|---|---|---|---|---|
| 2,913,240 | A * | 11/1959 | Mohr | F16F 1/366 267/149 |
| 4,489,450 | A * | 12/1984 | Miller | A47C 23/005 5/13 |
| 4,770,397 | A * | 9/1988 | Schulz, Jr. | A47C 23/0438 5/247 |
| 5,184,809 | A * | 2/1993 | Miller | A47C 23/02 5/267 |
| 5,720,471 | A * | 2/1998 | Constantinescu | A47C 23/02 5/255 |
| 6,431,684 | B1 | 8/2002 | Olsen | |
| 6,610,382 | B1 | 8/2003 | Kobe et al. | |
| 7,726,636 | B2 * | 6/2010 | Miller | A47C 17/40 5/255 |
| 2011/0031665 | A1 * | 2/2011 | DeFranks | F16F 3/023 267/144 |

FOREIGN PATENT DOCUMENTS

| | | | |
|---|---|---|---|
| TW | 550178 B | 9/2003 | |
| TW | I222889 B | 11/2004 | |
| WO | WO-2004049873 A1 * | 6/2004 | .......... A47C 27/065 |

* cited by examiner

*Primary Examiner* — Melanie Torres Williams
(74) *Attorney, Agent, or Firm* — Rabin & Berdo, P.C.

(57) ABSTRACT

A shock isolation cushion has two basal components and at least one shock isolation tier. The two basal components are disposed at an interval. The at least one shock isolation tier is disposed between the two basal components and is sequentially stacked from one of the two basal components to the other one of the two basal components. Wherein each of the at least one shock isolation tier has multiple shock isolation units. Each of the multiple shock isolation units has a supporting section and at least two buffering sections. The at least two buffering sections respectively extend from two opposite ends of the supporting section. Each of the at least two buffering sections is curved to form an opening between the buffering section and the supporting section.

6 Claims, 20 Drawing Sheets

SHOCK ISOLATION CUSHION

BACKGROUND OF THE INVENTION

1. Field of the Invention

The present invention relates to a cushion structure, and more particularly to a shock isolation cushion that can be made of various materials and has an adjustable buffering structure to provide different shock isolation effects.

2. Description of Related Art

With the maturation of the 3D printing technology, expenses and time for manufacturing 3D printed products are getting lower and shorter. There are more and more products manufactured by 3D printing accordingly, including not only implants produced by 3D printing in biotech industry, but also soles produced by 3D printing in footwear industry.

With reference to FIG. 17, a conventional shock isolation unit 90 is made of 3D printing materials and is produced by 3D printing. The conventional shock isolation unit 90 is hollow, is substantially ball-shaped, and has multiple through holes 91 defined through the conventional shock isolation unit 90. Each through hole 91 communicates with an interior of the conventional shock isolation unit 90. With reference to FIG. 18, multiple conventional shock isolation units 90 are stacked to form a supporting structure such as a cushion or a sole to provide functions of support, buffer or shock isolation.

The conventional shock isolation unit 90 shown in FIGS. 17 and 18 has a substantially ball shape that is symmetrical, such that the conventional shock isolation unit 90 is capable of evenly distributing and transmitting forces exerted from various directions. Therefore, the conventional shock isolation unit 90 being ball-shaped and symmetrical has high rigidity to provide good support effect. However, since the conventional shock isolation unit 90 is high in rigidity and has good support effect, the conventional shock isolation unit 90 being stacked cannot absorb forces by deformation and shaking.

Therefore, the conventional shock isolation unit 90 has to be made of materials with lower rigidity for the purpose of deformation. Consequently, the conventional shock isolation unit 90, though having high rigidity and providing good support, can only be made of limited types of materials and cannot use suitable materials according to circumstances of use.

To overcome the shortcomings of the conventional shock isolation unit 90, the present invention provides a shock isolation cushion to mitigate or obviate the aforementioned problems.

SUMMARY OF THE INVENTION

The main objective of the present invention is to provide a shock isolation cushion that is easy to deform and shake to stop transmission of shock.

The shock isolation cushion has two basal components and at least one shock isolation tier. The two basal components are disposed at an interval. The at least one shock isolation tier is disposed between the two basal components and is sequentially stacked from one of the two basal components to the other one of the two basal components. Wherein each one of the at least one shock isolation tier has multiple shock isolation units. Each one of the multiple shock isolation units has a supporting section and at least two buffering sections. The at least two buffering sections respectively extend from two opposite ends of the supporting section. Each one of the at least two buffering sections is curved to form an opening between the buffering section and the supporting section.

Other objects, advantages, and novel features of the invention will become more apparent from the following detailed description when taken in conjunction with the accompanying drawings.

DETAILED DESCRIPTION OF PREFERRED EMBODIMENTS

Figure 1:
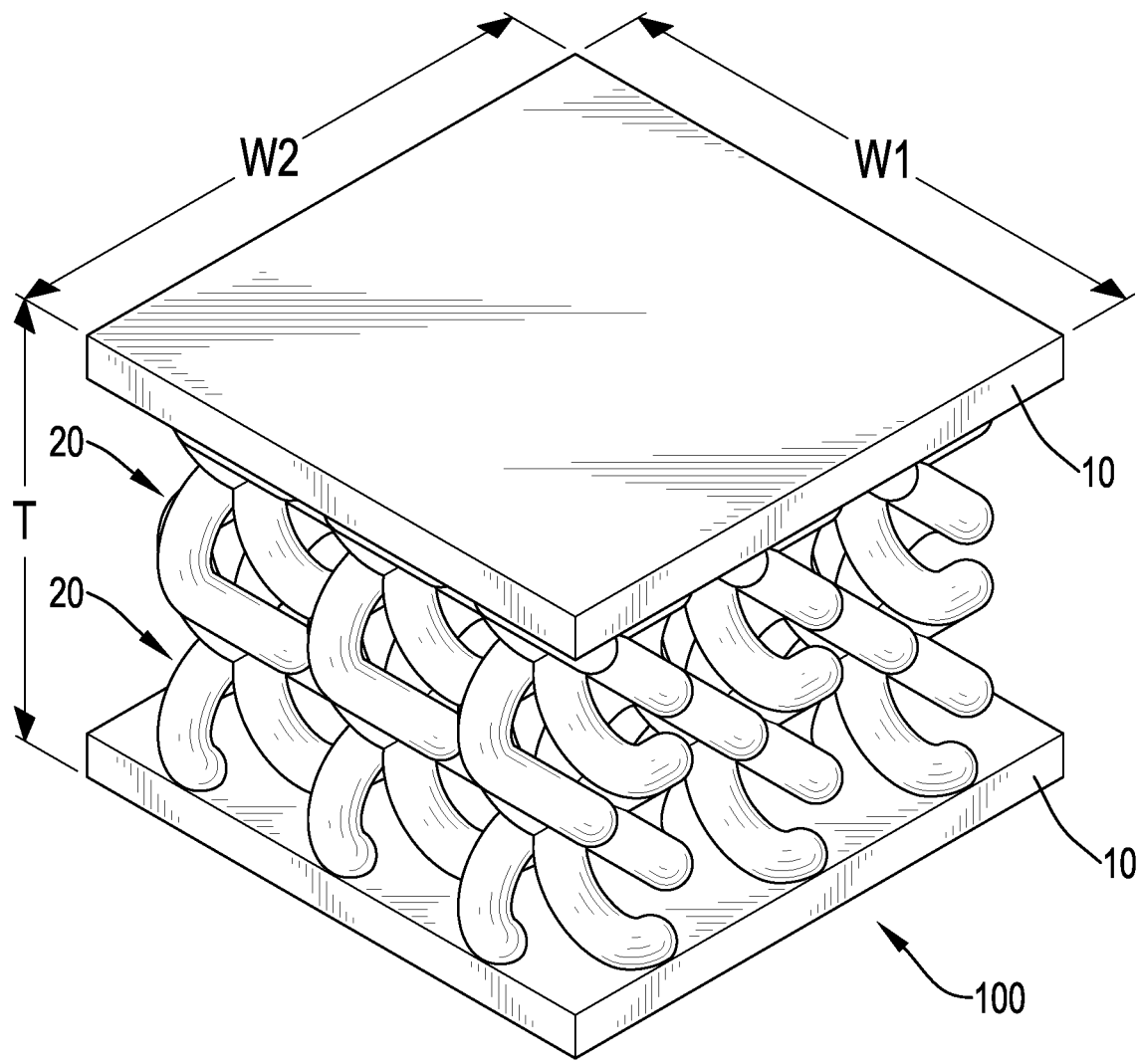
FIG. 1 is a perspective view of a shock isolation cushion in accordance with the present invention.
Figure 2:
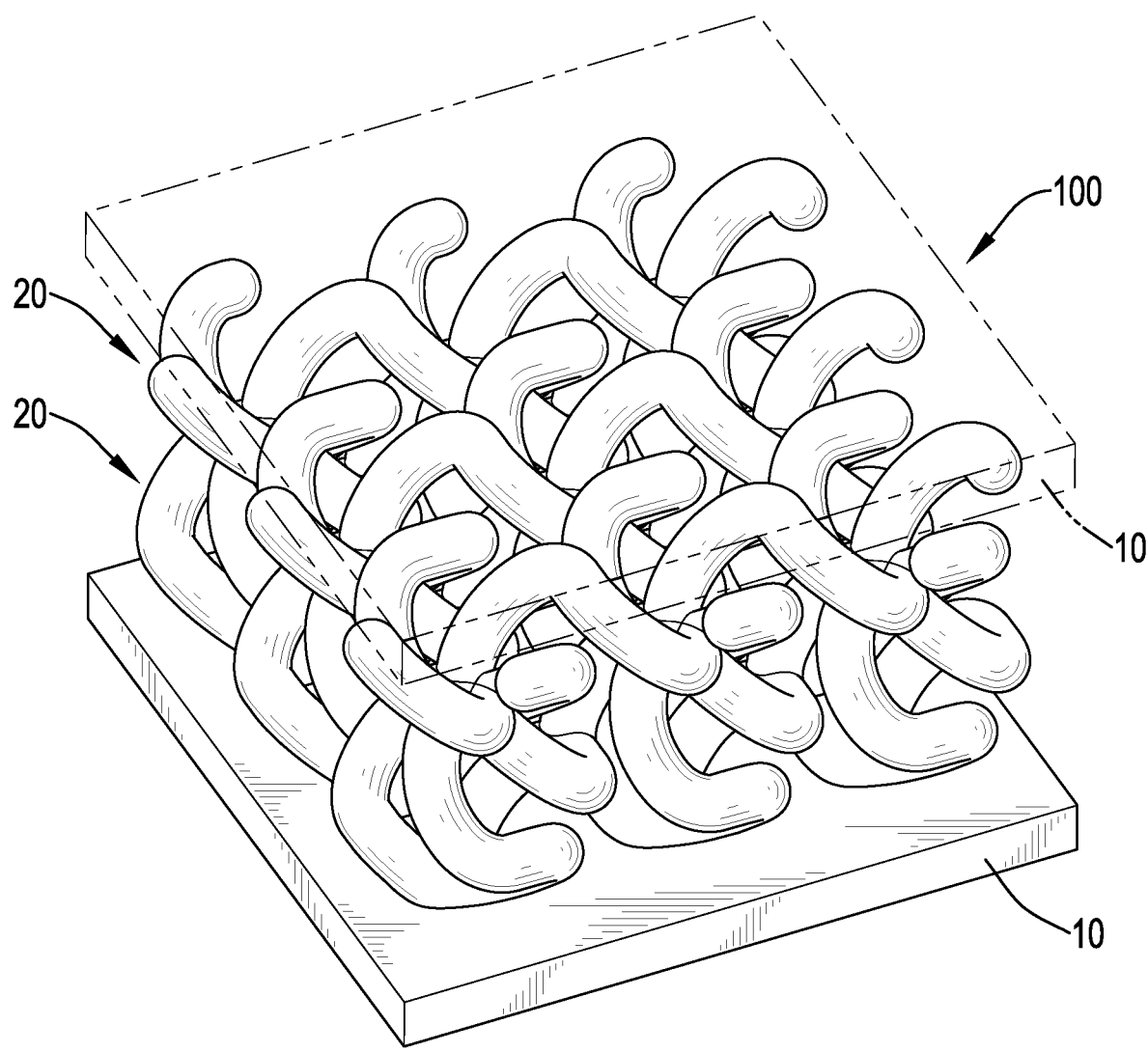
FIG. 2 is another perspective view of the shock isolation cushion in FIG. 1.
Figure 3A:
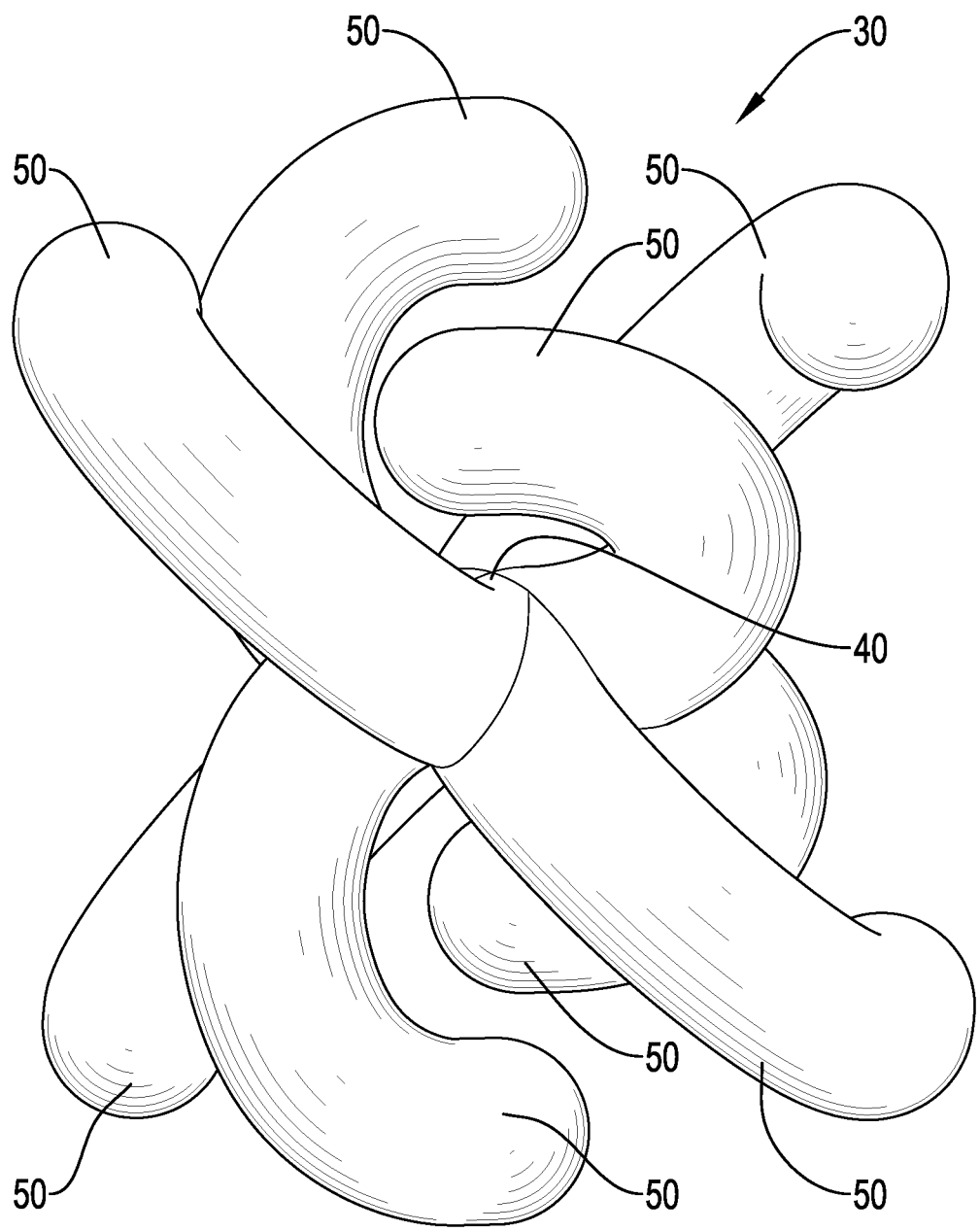
FIG. 3A is a perspective view of a shock isolation unit of the shock isolation cushion in FIG. 1.
Figure 3B:
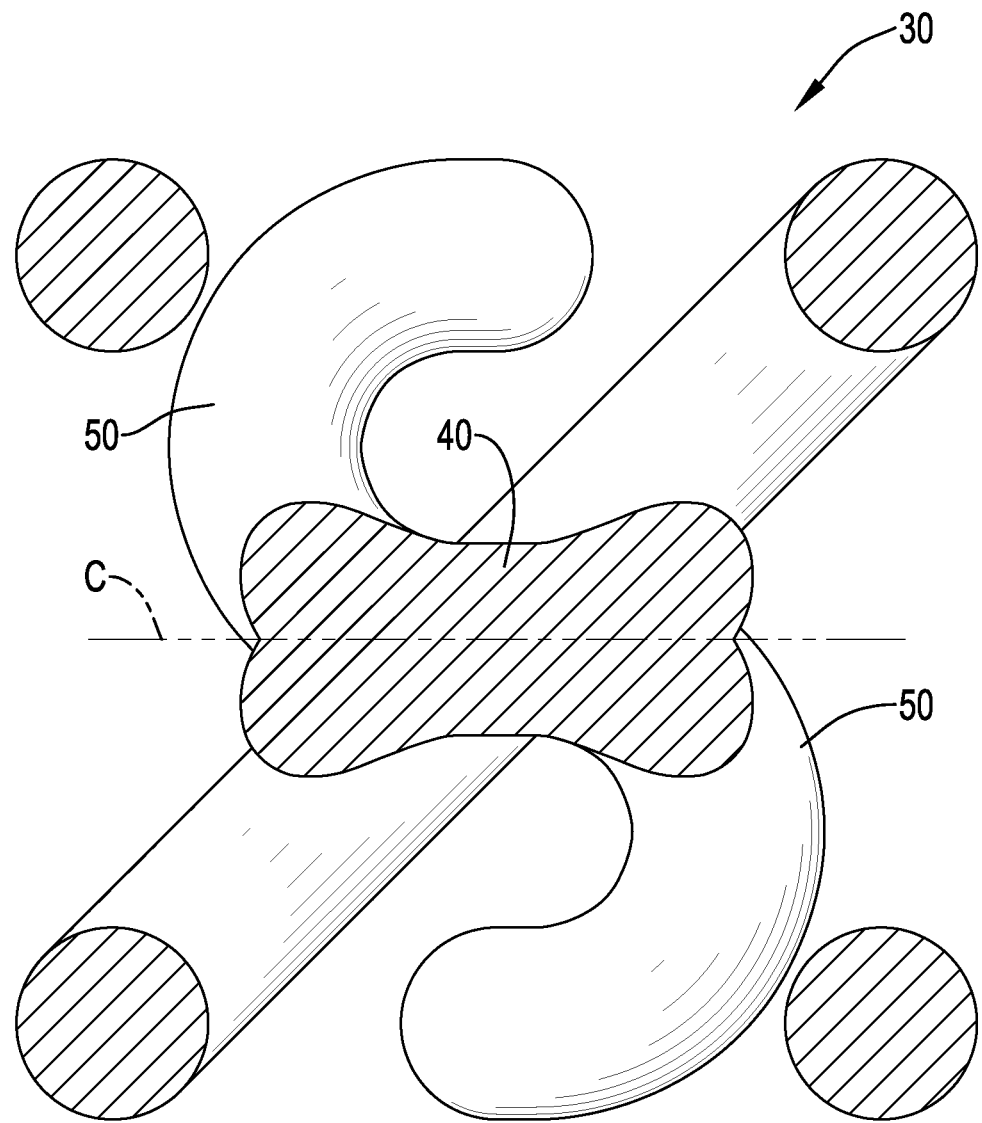
FIG. 3B is a cross-sectional side view of the shock isolation unit in FIG. 3A.

With reference to FIGS. 1 and 2, a shock isolation cushion 100 has two basal components 10 and two shock isolation tiers 20. Each basal component 10 is shaped as a board. The two basal components 10 are disposed at an interval. The two shock isolation tiers 20 are sequentially stacked from one of the basal components 10 to the other one basal component 10. With reference to FIGS. 2, 3A, and 3B, each shock isolation tier 20 has multiple shock isolation units 30 disposed separately. Each shock isolation unit 30 has a supporting section 40 and at least two buffering sections 50. The supporting section 40 straightly extends along a central axis C and has two opposite ends. The at least two buffering sections 50 respectively extend from the two opposite ends of the supporting section 40. Each of the buffering sections 50 is curved to form an opening between the buffering section 50 and the supporting section 40.

With reference to FIGS. 1 and 2, in the embodiment of the present invention, each basal component 10 has a square contour. The shock isolation cushion 100 has two widths W1, W2, and a thickness T. Practically, the contour of each basal component 10 may be designed to be a polygon such as a rectangle or a triangle depending on products to be manufactured. The contour of each basal component 10 may be even designed to be circular or elliptic. Furthermore, the contours of the two basal components 10 may be designed in two different shapes. The contour of each basal component 10 is not restricted in the present invention.

With reference to FIGS. 1, 2, 3A, and 3B, in the embodiment of the present invention, each shock isolation unit 30 has one said supporting section 40 and eight said buffering sections 50. Four of the buffering sections 50 extend from one of the two opposite ends of the supporting section 40. The other four buffering sections 50 extend from the other one of the two opposite ends of the supporting section 40. Practically, each shock isolation unit 30 may have at least two buffering sections 50. Amount of the buffering sections of each shock isolation unit 30 is not restricted in the present invention, and the buffering sections 50 may twist in various angles and extend toward various directions.

Figure 4:
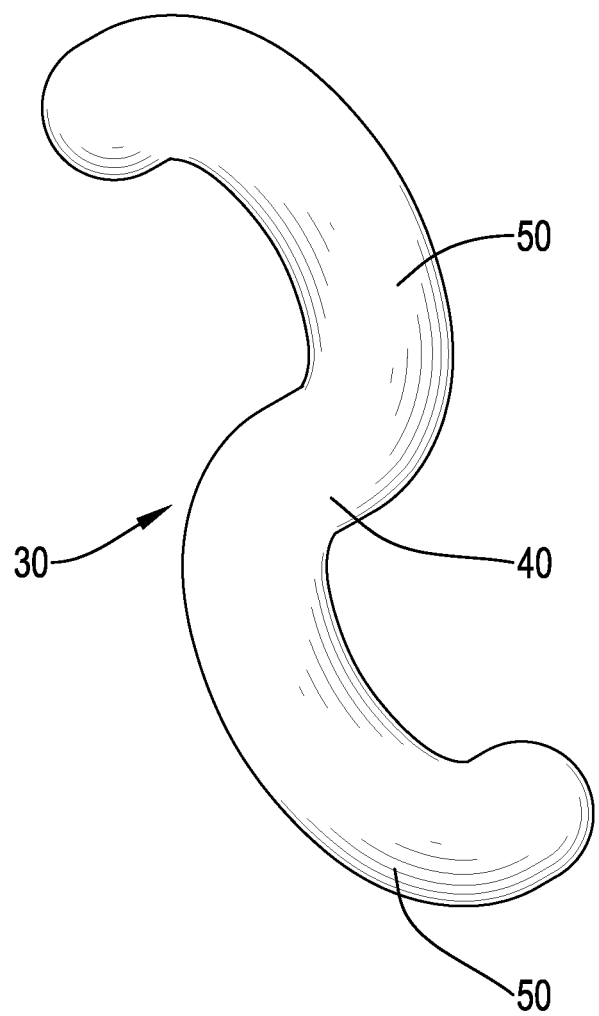
FIG. 4 is a perspective view of a shock isolation unit of the shock isolation cushion in FIG. 1.

With reference to FIGS. 3A, 3B, and 4, each shock isolation unit 30 has a diameter.

Figure 5:
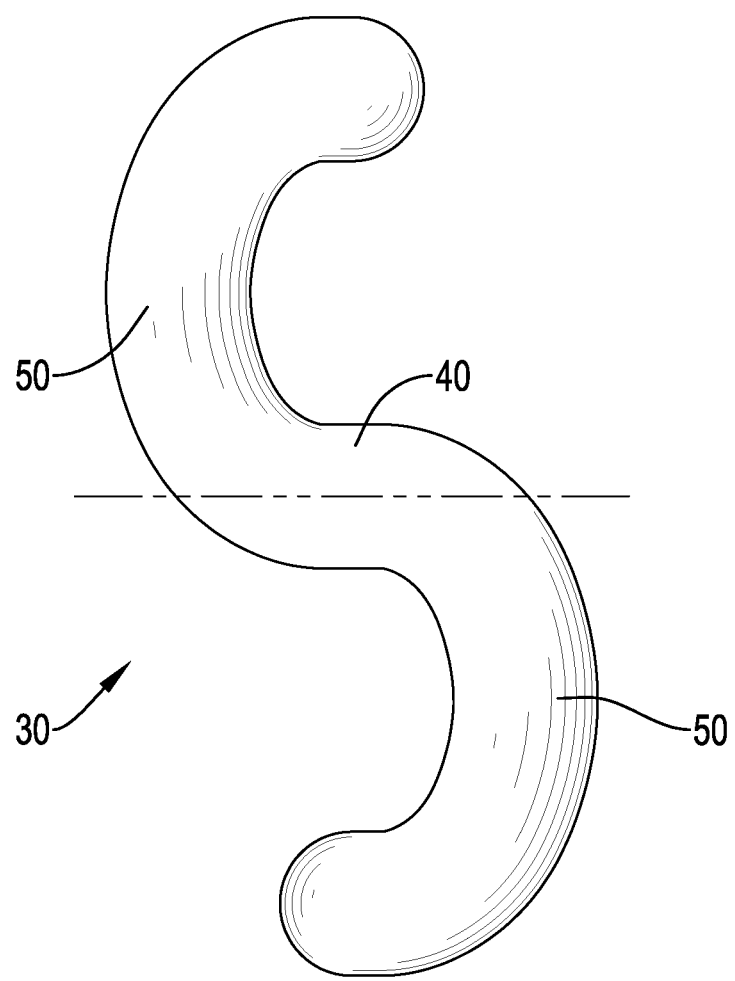
FIGS. 5 to 9 are side views of the shock isolation unit of the shock isolation cushion in FIG. 1, showing different configurations of the shock isolation units.

With reference to FIG. 5, when the two buffering sections 50 of each shock isolation unit 30 are respectively disposed above and below the supporting section 40 of the shock isolation unit 30, the shock isolation unit 30 is considered to be erectly arranged and is suitable for supporting buildings such as bridges or houses. The shock isolation unit 30 erectly disposed is suitable for offering high intensity support and can be made of aluminum alloy, lead alloy, titanium alloy, or copper alloy.

Figure 6:
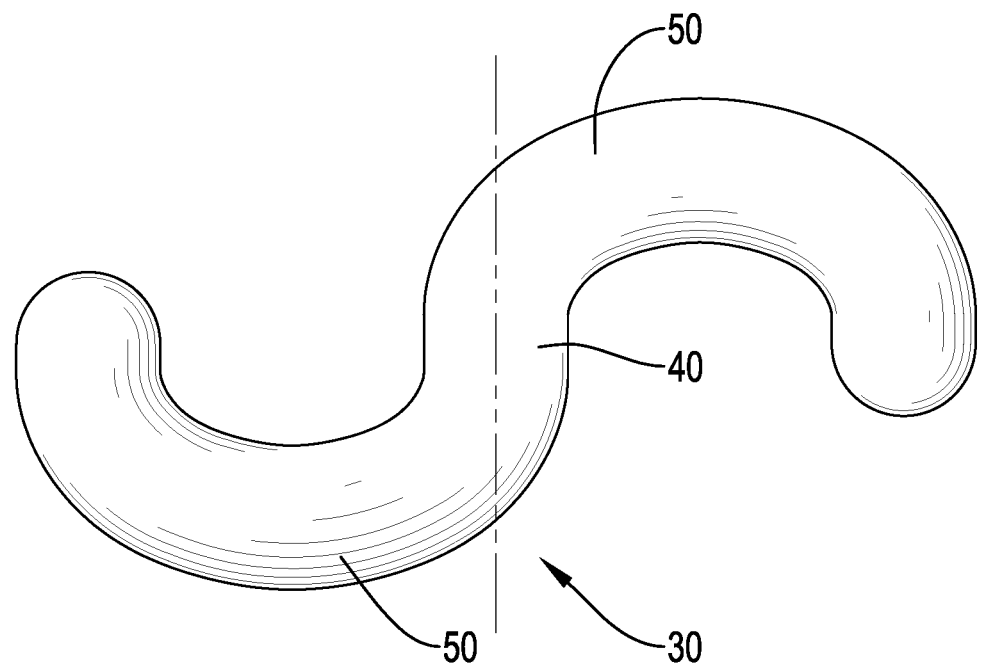
Figure 7:
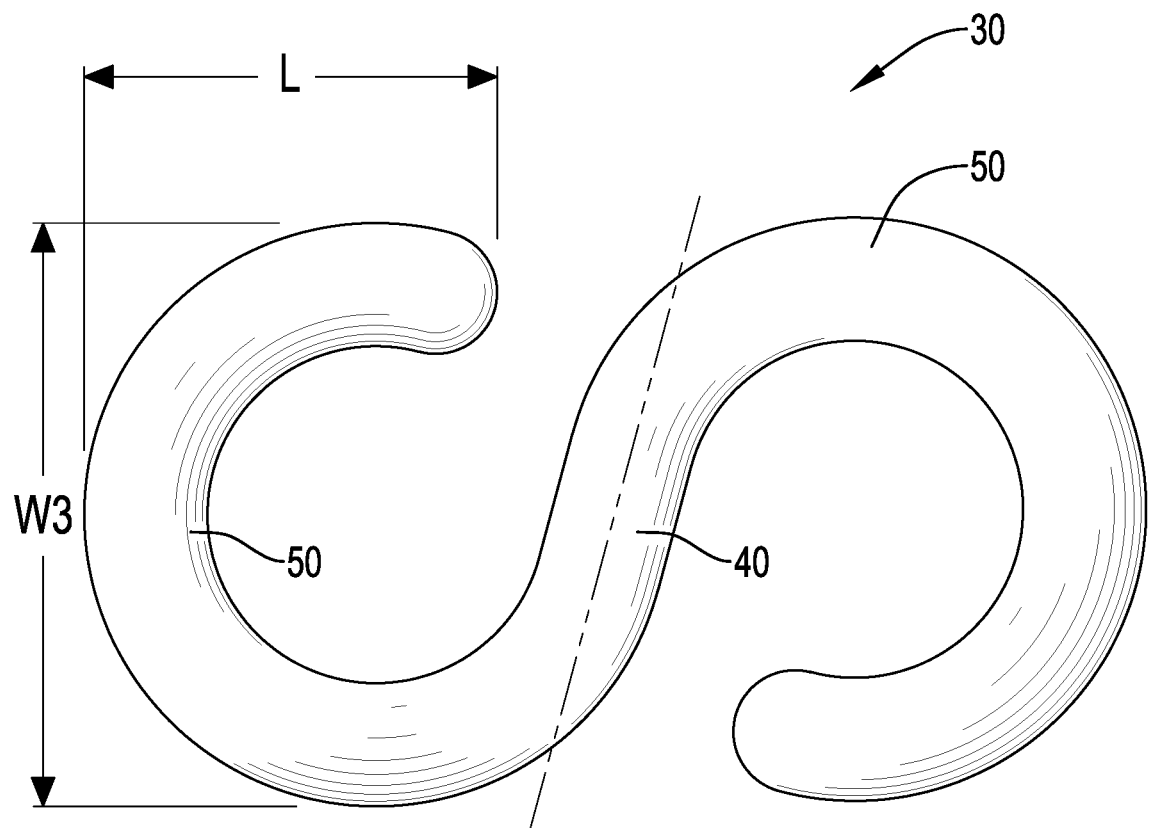

With reference to FIGS. 6 and 7, when the two buffering sections 50 of each shock isolation unit 30 are respectively disposed at a right side and a left side of the supporting section 40 of the shock isolation unit 30, the shock isolation unit 30 is considered to be laterally arranged and is suitable for mattresses and yoga mats. The shock isolation unit 30 laterally arranged can be made of nylon, be woven to be curved to form the buffering sections 50 of the shock isolation unit 30, and the supporting section 40 of the shock isolation unit 30 can be used to limit thickness T of the shock isolation cushion 100.

In FIG. 5, the two openings of the two buffering sections 50 of the shock isolation unit 30 respectively face to left and right oppositely. In FIG. 6, the two openings of the two buffering sections 50 of the shock isolation unit 30 respectively face upwards and downwards oppositely. With reference to FIGS. 5 and 6, in the present invention, the two openings of the two buffering sections 50 of each shock isolation unit 30 can respectively face to opposite directions.

In FIG. 7, the two openings of the two buffering sections 50 of the shock isolation unit 30 respectively face to left and right, but the two openings face to each other. Therefore, in the present invention, the two openings can also face to each other.

Figure 8:
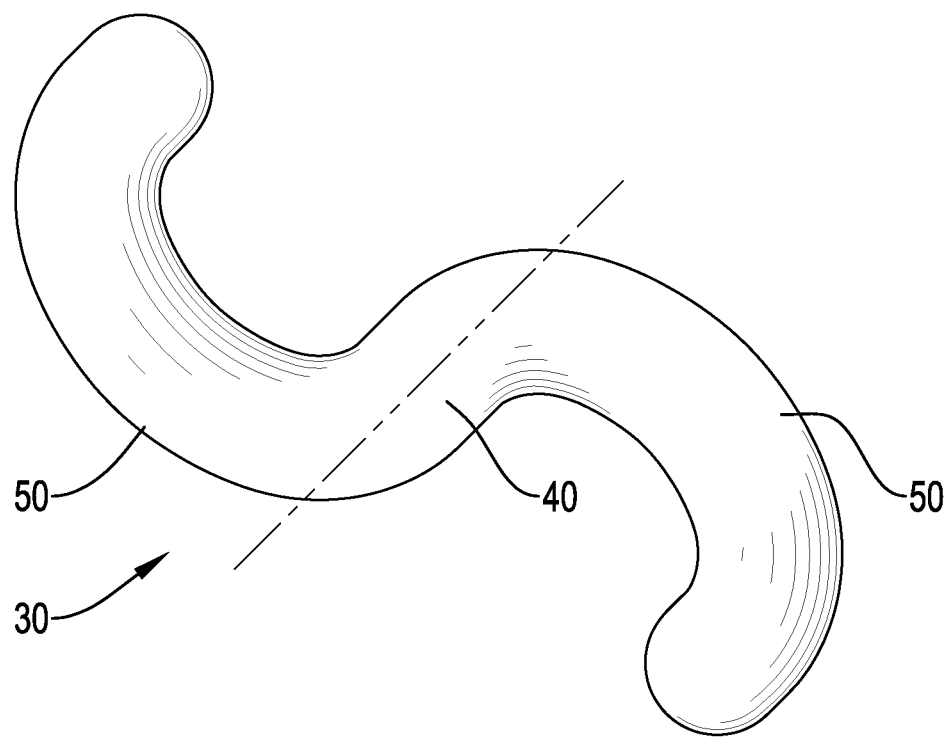

With reference to FIG. 8, the supporting section 40 of each shock isolation unit 30 may be obliquely arranged corresponding to each buffering section 50 of the shock isolation unit 30 and has an oblique angle. The oblique angle of the supporting section 40 of each shock isolation unit 30 may be adjusted to have various supporting intensity during manufacturing. The shock isolation cushion 100 of the present invention is more deformable when the supporting section 40 of each shock isolation unit 30 is obliquely arranged. Therefore, the shock isolation cushion 100 can achieve critical damping from a circumstance of under damping when the shock transmits. When the supporting section 40 of each shock isolation unit 30 is obliquely arranged, the shock isolation cushion 100 may be made of materials such as polyethylene (PE), polyphenylsulfone (PPSU), rubber, isobutylene, polyurethane, or polyaspartic polyuria and is applicable to a machine or to an engine for shock isolation or to be a shock isolation pad of a speaker to stop the shock transmission caused by operation.

Figure 9:
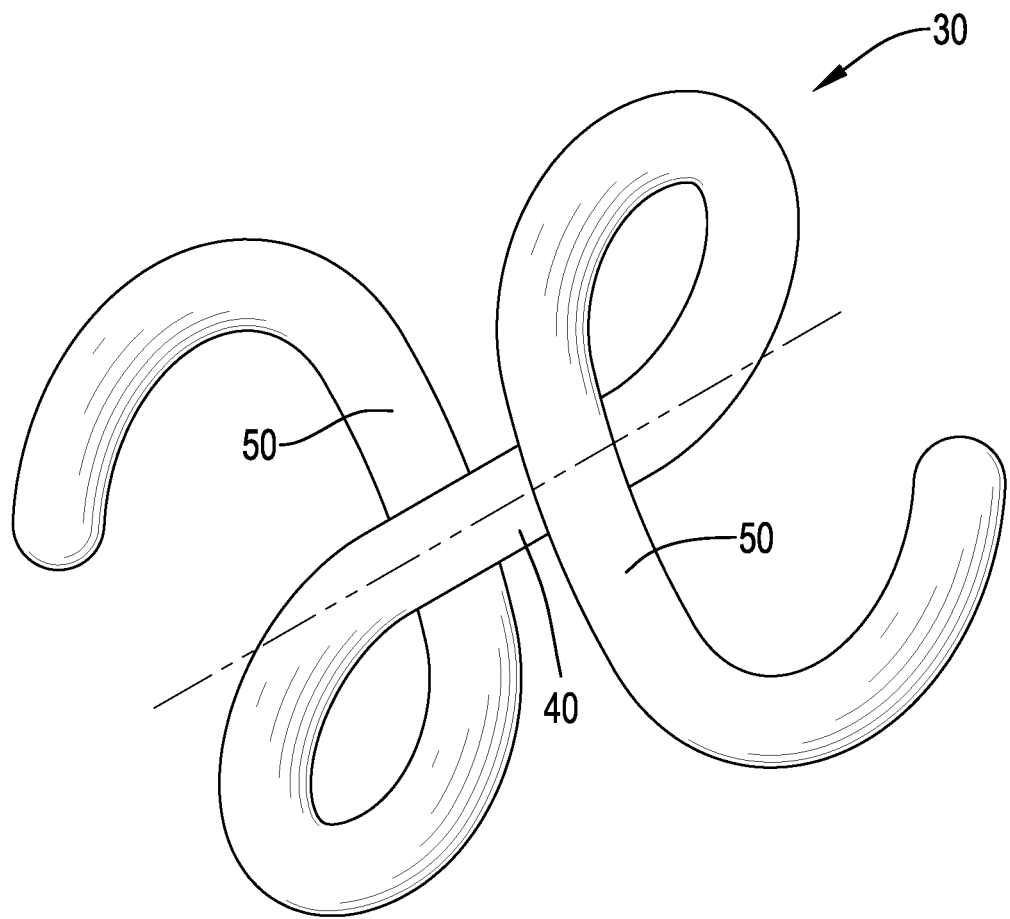

In FIG. 5, each buffering section 50 of the shock isolation unit 30 extends 180° from the supporting section of the shock isolation unit 30. In FIGS. 7 and 9, each buffering section 50 of the shock isolation unit 30 extends 270° from the supporting section 40 of the shock isolation unit 30. Practically, each buffering section 50 of each shock isolation unit 30 has an extending angle and a range of the extending angle can be 90° to 270° from the supporting section 40 of the shock isolation unit 30. The extending angle of each buffering section 50 of each shock isolation unit 30 can be adjusted to adjust support effect of the shock isolation cushion 100 of the present invention.

Figure 10:
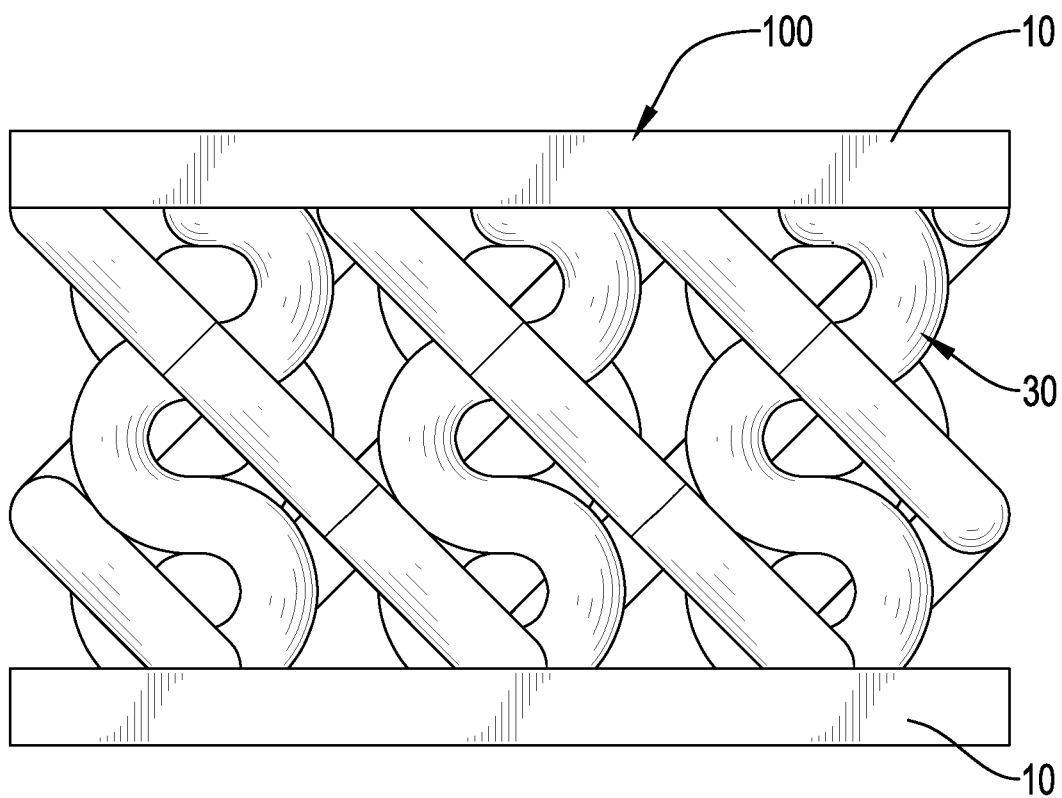
FIG. 10 is a side view of the shock isolation cushion in FIG. 1.

With reference to FIGS. 1 and 2, in the embodiment of the present invention, the shock isolation cushion 100 of the present invention has two said shock isolation tiers 20. Practically, as showing in FIG. 10, the shock isolation cushion 100 may have one and a half shock isolation tiers. Amount of the shock isolation tier 20 of the shock isolation cushion 100 can be adjusted according to products to be manufactured. The amount of the shock isolation tier 20 is not restricted in the present invention.

With reference to FIGS. 1 to 4, the supporting section 40 of each shock isolation unit 30 is mainly for support. Each buffering section 50 of each shock isolation unit 30 is easily deformed. Compared to the conventional shock isolation unit 90 in a ball shape and being synthetical, in the present invention, each buffering section 50 of each shock isolation unit 30 is easier to be deformed due to its curved contour and its opening formed between the buffering section 50 and the supporting section 40 of the shock isolation unit 30. Furthermore, the supporting section 40 being straightly extending can split the force into component forces along with various directions to let the shock isolation cushion 100 of the present invention shake. The shock isolation cushion 100 of the present invention can achieve a better shock isolation effect via deforming and shaking.

Figure 11A:
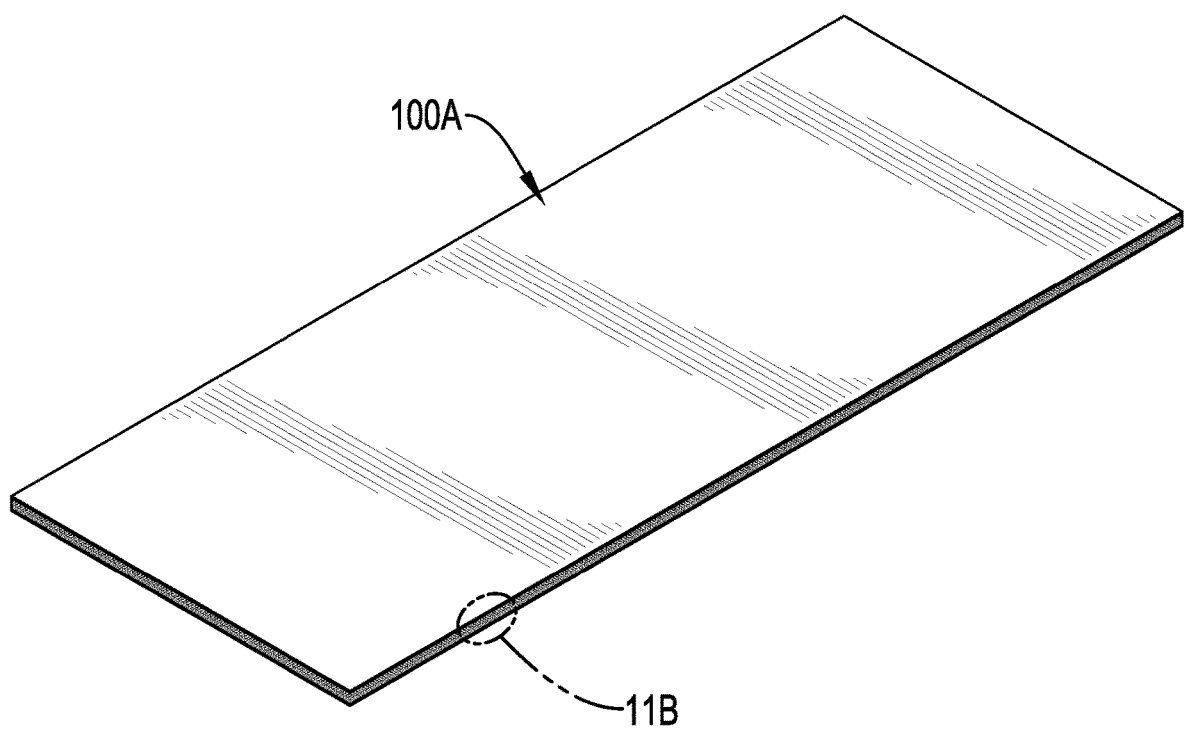
FIG. 11A is a perspective view of a mattress made of the shock isolation cushion in FIG. 1.
Figure 11B:
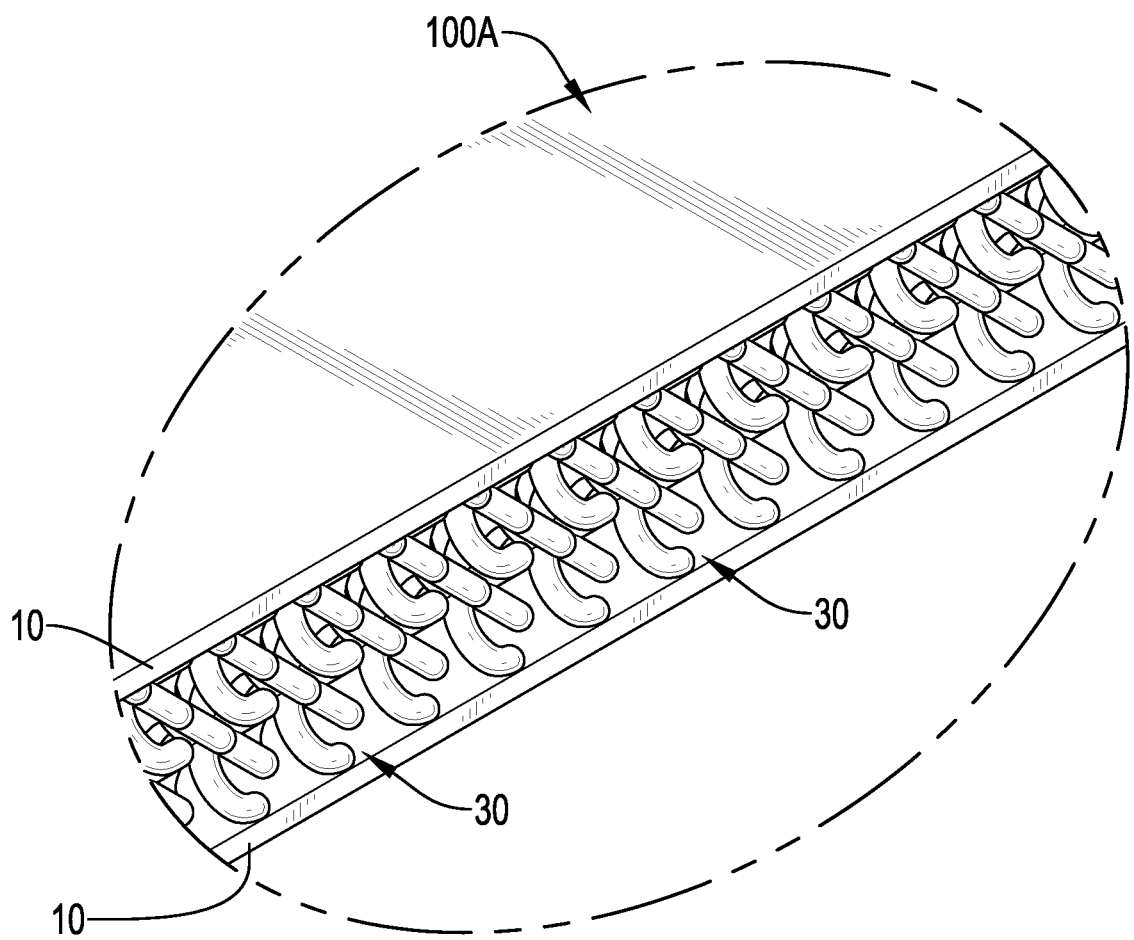
FIG. 11B is an enlarged perspective view of the mattress in FIG. 11A.

With reference to FIGS. 1, 11A, and 11B, the shock isolation cushion 100 of the present invention can applied for mattresses with large areas such as floor mats or yoga mats. Moreover, the widths W1, W2, the thickness T of the shock isolation cushion 100, and the diameter of each shock isolation unit 30 of the shock isolation cushion 100 can be modified to adjust the shock isolation effect or the support effect of the shock isolation cushion 100. With reference to the shock isolation unit 30 shown in FIG. 7, each buffering section 50 of the shock isolation unit 30 has a width W3 and a length L. The shock isolation effect or the support effect of the shock isolation cushion 100 may also be adjusted via modifying the width W3 and the length L of the buffering section 50 of the shock isolation unit 30.

As tested, stiffness of the shock isolation cushion 100 in various sizes and made of polyurethane is listed in Table 1.

TABLE 1

| | Test piece | | | |
| --- | --- | --- | --- | --- |
| Serial No. | W1 (mm) | W2 (mm) | T (mm) | Stiffness (N/m) |
| 1 | 52.57 | 52.68 | 23.81 | 313748.39 |
| 2 | 29.64 | 29.89 | 14.77 | 258385.65 |

TABLE 1-continued

| Serial No. | Test piece | | | |
|---|---|---|---|---|
| | W1 (mm) | W2 (mm) | T (mm) | Stiffness (N/m) |
| 3 | 12.86 | 12.84 | 9.39 | 17036.28 |
| 4 | 14.57 | 14.48 | 15.06 | 2129.58 |

Figure 12:
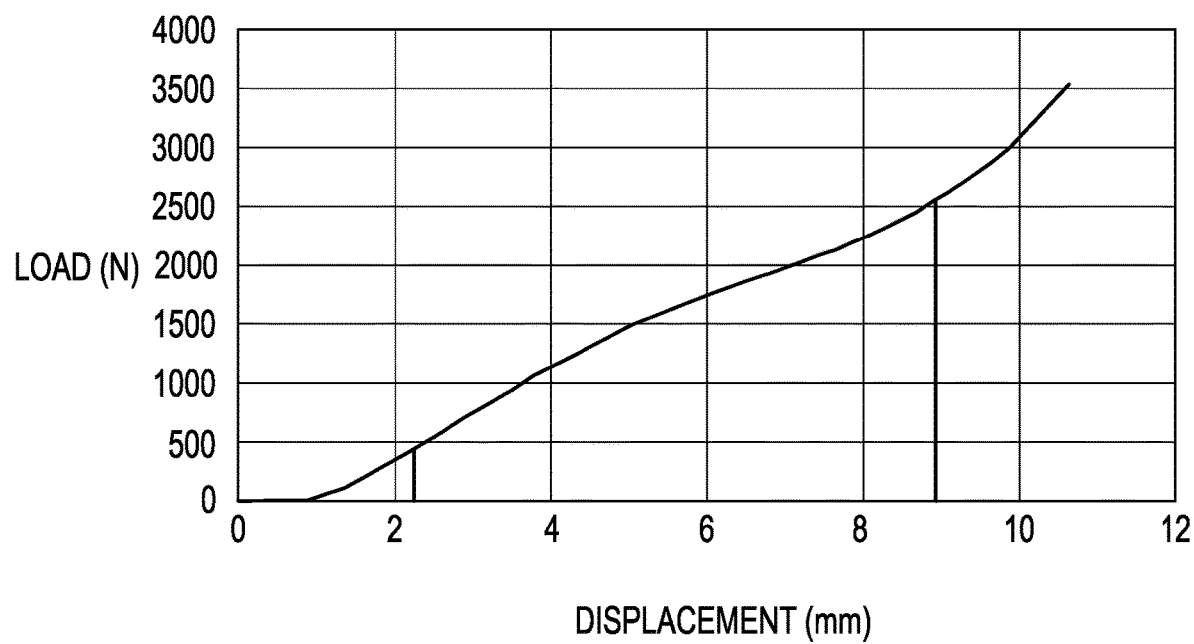
FIGS. 12 to 15 are measured curves of various shock isolation cushions in accordance with the present invention.

FIG. 12 is a measured curve of the shock isolation cushion 100 of serial No. 1 of load versus displacement. With reference to Table 1 and FIG. 12, the widths W1, W2 of the shock isolation cushion 100 are both about 50 mm, and the thickness T of the shock isolation cushion 100 is about 23 mm. The diameter of each shock isolation unit 30 of the shock isolation cushion 100 of serial No. 1 is 5 mm. The width W3 and the length L of the buffering section 50 of each shock isolation unit 30 are at a ratio of 1:1.

Figure 13:
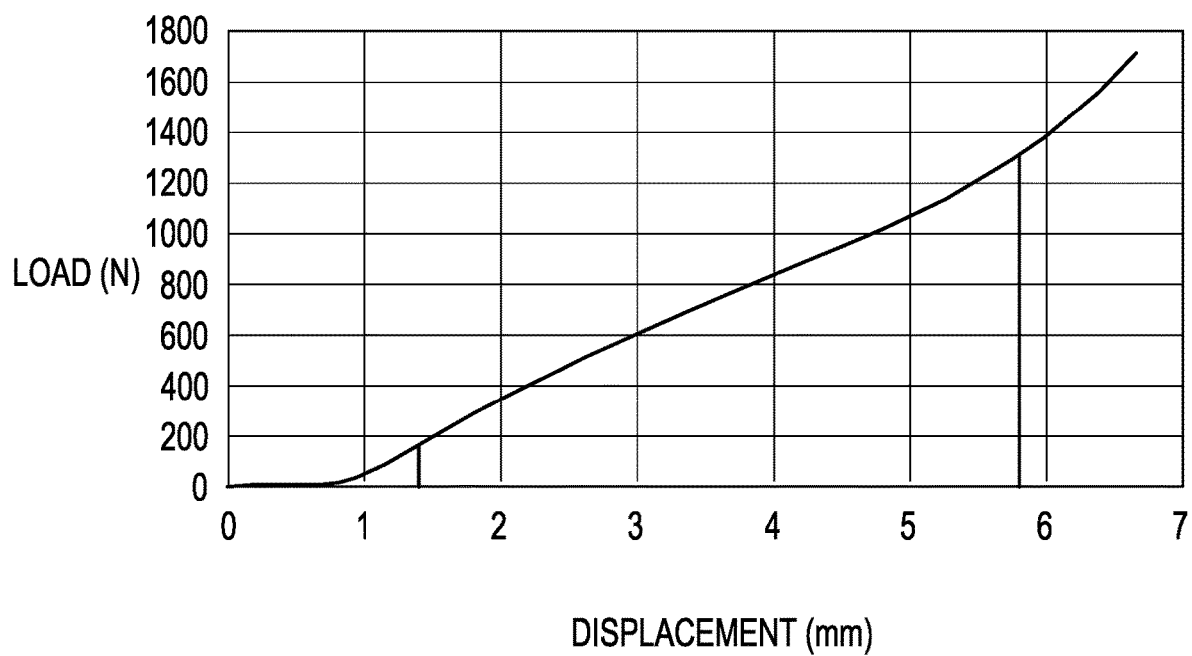

FIG. 13 is a measured curve of the shock isolation cushion 100 of serial No. 2 of load versus displacement. With reference to Table 1 and FIG. 13, the widths W1, W2 of the shock isolation cushion 100 are both about 30 mm, and the thickness T of the shock isolation cushion 100 is about 15 mm. The diameter of each shock isolation unit 30 of the shock isolation cushion 100 of serial No. 2 is 2.5 mm. The width W3 and the length L of the buffering section 50 of each shock isolation unit 30 are at a ratio of 1:1.

Compared to FIGS. 12 and 13, the widths and the thicknesses of the shock isolation cushions 100 of serial No. 1 and 2 are different. However, trends of the measured curves of load versus displacement remain the same as the diameters of the shock isolation units 30 of the shock isolation cushions 100 are different.

Figure 14:
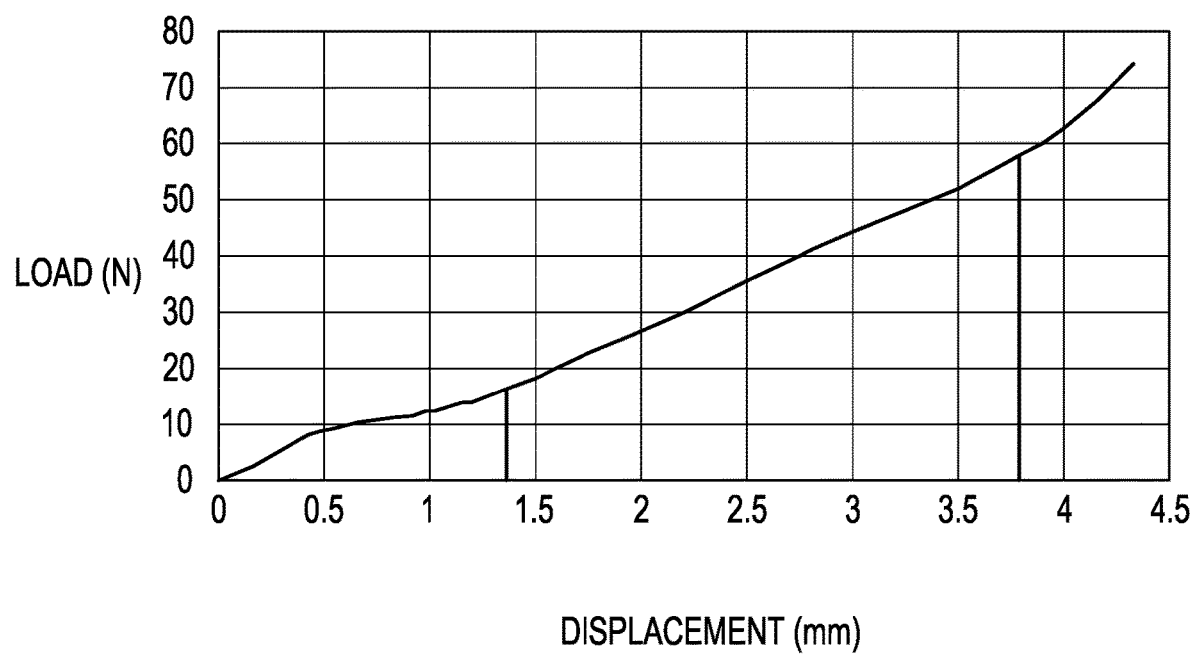

FIG. 14 is a measured curve of the shock isolation cushion 100 of serial No. 3 of load versus displacement. With reference to Table 1 and FIG. 14, the width W1 and the width W2 of the shock isolation cushion 100 are both about 13 mm, and the thickness T of the shock isolation cushion 100 is about 10 mm. The diameter of each shock isolation unit 30 of the shock isolation cushion 100 of serial No. 3 is 1 mm. The width W3 and the length L of the buffering section 50 of each shock isolation unit 30 are at a ratio of 1:1.

Figure 15:
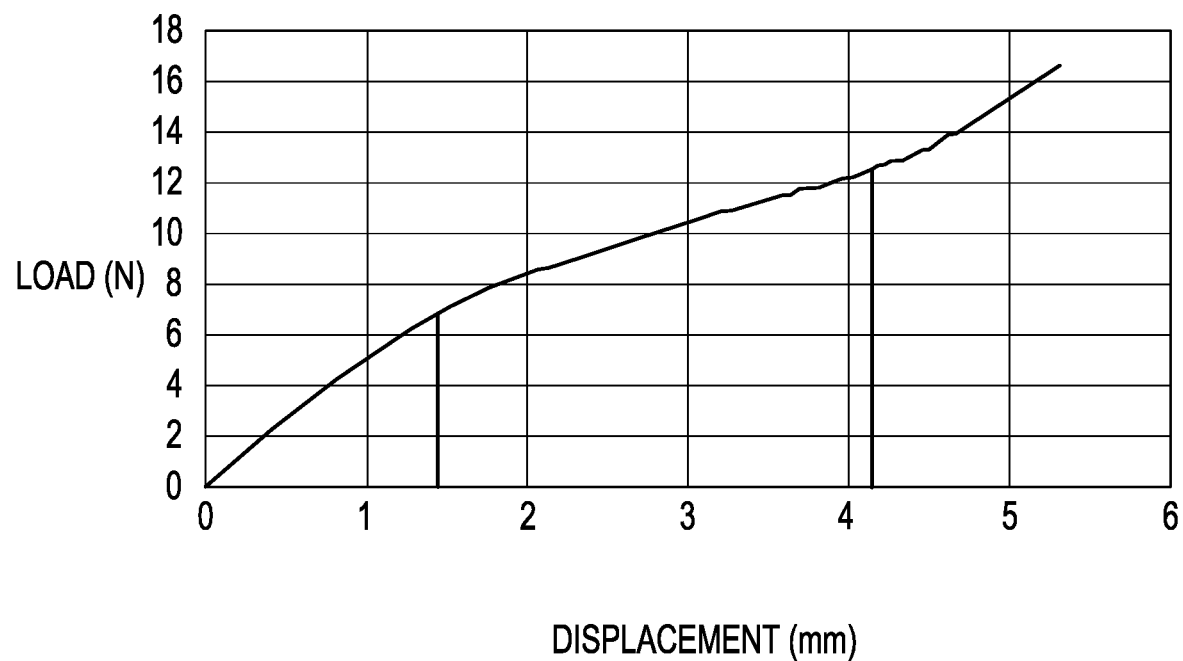

FIG. 15 is a measured curve of the shock isolation cushion 100 of serial No. 4 of load versus displacement. With reference to Table 1 and FIGS. 7 and 15, the width W1 and the width W2 of the shock isolation cushion 100 are both about 15 mm, and the thickness T of the shock isolation cushion 100 is about 15 mm. The diameter of each shock isolation unit 30 of the shock isolation cushion 100 of serial No. 4 is 1 mm. Difference between the shock isolation cushions 100 of serial No. 3 and 4 is that the width W3 and the length L of the buffering section 50 of each shock isolation unit 30 of the shock isolation cushion 100 of serial No. 4 are at a ratio 1:2.3.

With reference to FIG. 15, when the shock isolation cushion 100 of serial No. 4 is subjected to a load being about 7 to 13 N, the shock isolation cushion 100 of serial No. 4 has a displacement about 1.4 to 4.1 mm. With reference to FIG. 14, when the shock isolation cushion 100 of serial No. 3 is subjected to a load about 15 to 57 N, the shock isolation cushion 100 of serial No. 3 has a displacement about 1.4 to 3.7 mm. When the diameters of the shock isolation units 30 of the shock isolation cushions 100 of serial No. 3 and No. 4 are the same but the widths and the thickness of the shock isolation cushions 100 of serial No. 3 and No. 4 are different, the shock isolation cushions 100 of serial No. 3 and No. 4 have similar displacements; however, the shock isolation cushion 100 of serial No. 3 is subjected to a wider range of load than the shock isolation cushion 100 of No. 4.

Figure 16:
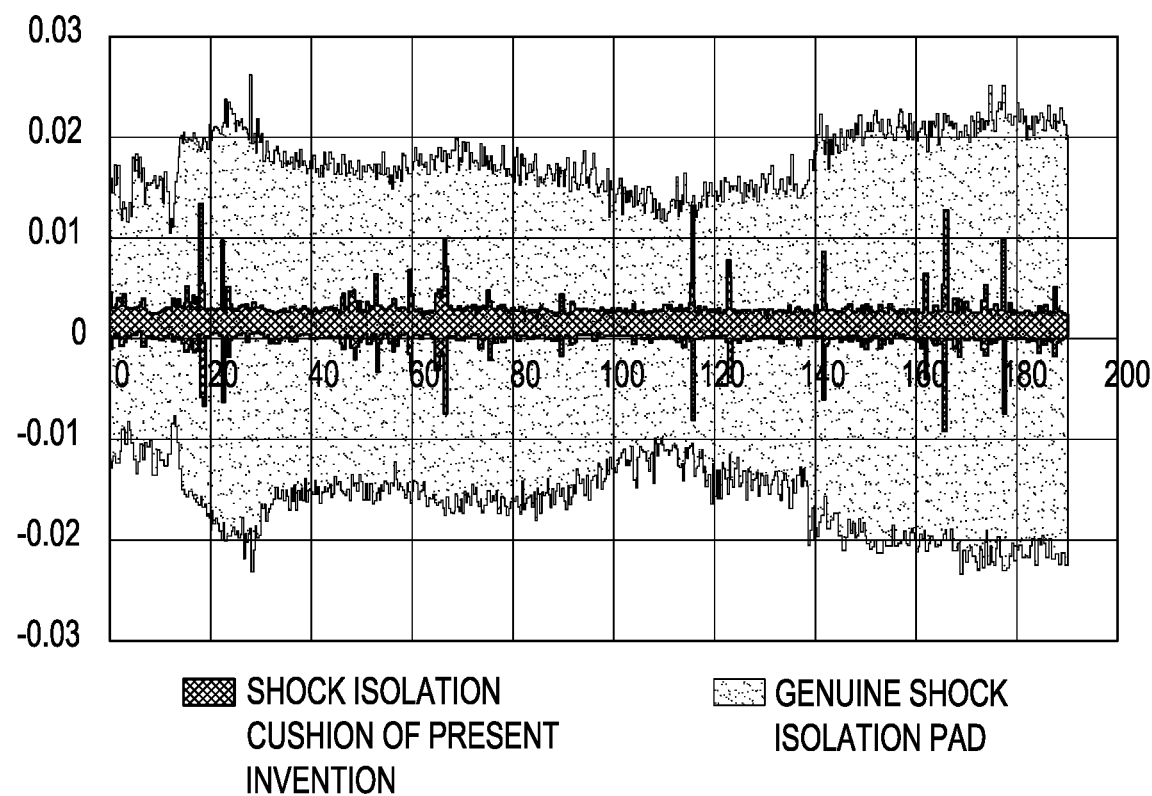
FIG. 16 is a measured curve of a mattress made of the shock isolation cushion in accordance with the present invention.
Figure 17:
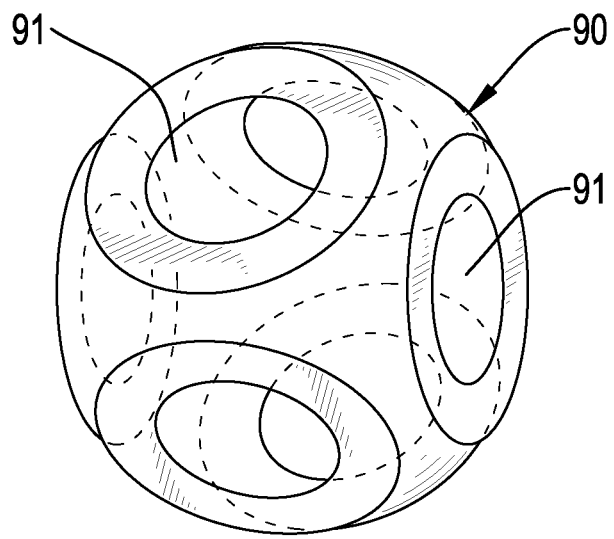
FIG. 17 is a perspective view of a conventional shock isolation unit in accordance with the prior art.
Figure 18:
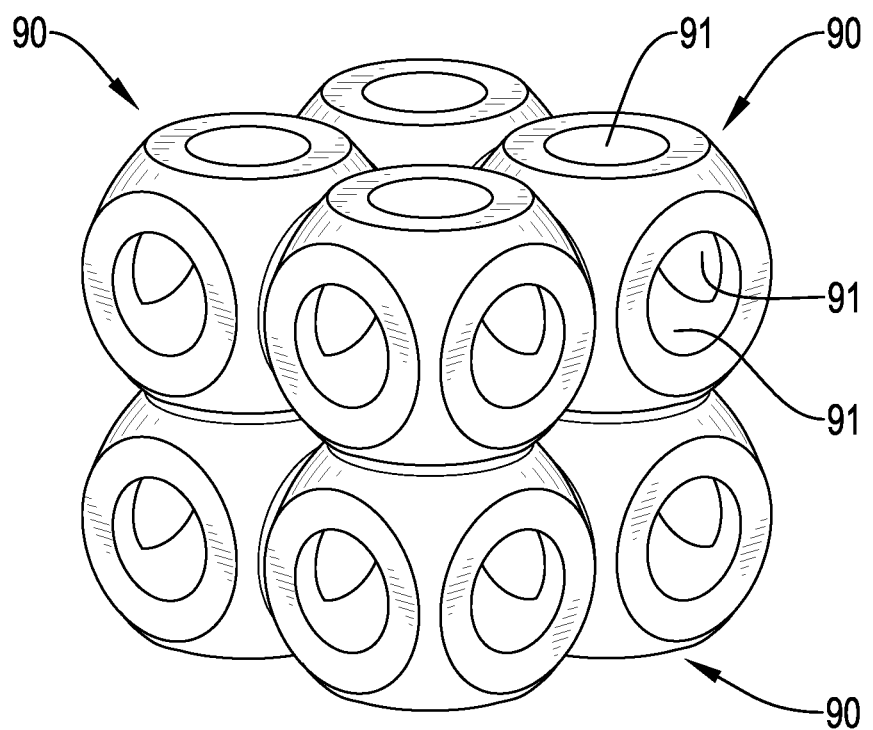
FIG. 18 is a perspective view of a supporting structure formed by stacking a plurality of the conventional shock isolation units.

During the test, the shock isolation cushion 100 of serial No. 3 is applied to a tube mixer weighted 3.8 Kg. The shock isolation cushions 100 are respectively mounted to four footings for shock isolation. Data of the test is showed in FIG. 16. In FIG. 16, when the tube mixer mounted by the shock isolation cushions 100 is in full speed operation, acceleration of vibrated floor is measured as orange curve in FIG. 16. When the shock isolation cushions 100 of serial No. 3 are applied, the acceleration of the vibrated floor is about 0.0015 g. When the tube mixer is mounted by genuine shock isolation pads and is in full speed operation, the acceleration of the vibrated floor is showed as blue curve in FIG. 16. When the genuine shock isolation pads are applied, the acceleration of the vibrated floor is about 0.015 g. Compared to the orange curve and the blue curve in FIG. 16, the acceleration of the vibrated floor tested when the tube mixer mounted with shock isolation cushions 100 of serial No. 3 is one tenth of the acceleration of the vibrated floor tested when the tube mixer is mounted with the genuine shock isolation pads.

Regarding a single shock isolation unit 30, the oblique angle of the supporting section 40 of the shock isolation unit 30, the extending angle of each buffering section 50 of the shock isolation unit 30, and the width W3 and the length L of each buffering section 50 of the shock isolation unit 30 can be modified to change the shock or support effect of the shock isolation cushion 100 of the present invention.

With Table 1 and FIGS. 1 and 12 to 15, when the multiple shock isolation units 30 are composed to the shock isolation cushion 100 showed in FIG. 1, the widths W1, W2, the thickness t, and the amounts of the shock isolation tiers 20 of the shock isolation cushion 100 can be modified to change the shock isolation effect and the support effect of the shock isolation cushion 100. The shock isolation cushion 100 of the present invention can be made by weaving or 3D printing.

The shock isolation cushion 100 of the present invention can achieve various shock isolation and support effects via different modifications. The present invention can be applied to various products accordingly. The present invention not only can be applied for manufacturing insoles or yoga mattress, but also can be applied for eliminating shocks of machines, sophisticated devices, engines, or speakers. Nevertheless, the present invention can even be applied for buildings. The shock isolation cushion 100 of the present invention can be made of polymetric materials such as polyimide (PI), vinyl fluoride, polycarbonate (PC), nylon, polyphenylsulfone (PPSU), polyaspartic Polyurea, fire proof rubber, flame retardant resin, or Kevlar. The present invention may even be made of metal such as aluminum, copper, lead, titanium alloy, or nickel-based alloy.

The shock isolation cushion 100 of the present invention can be applied to various machines for shock isolation. The contour of one of the two basal components 10 can be designed according to various machines or various heavy objects. The contour of the other one of the two basal components 20 can be designed according to supporting surfaces such as the ground. For example, one of the basal components 10 can be designed as a short round pillar according to a heavy object.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A shock isolation cushion comprising:
two basal components disposed at an interval; and
at least one shock isolation tier disposed between the two basal components and sequentially stacked from one of the two basal components to the other one of the two basal components;
wherein each of the at least one shock isolation tier has multiple shock isolation units, and each of the multiple shock isolation units has
a supporting section; and
at least two buffering sections respectively extending from two opposite ends of the supporting section, and each of the at least two buffering sections being curved to form an opening between the buffering section and the supporting section, wherein
two of the openings formed by two of the at least two buffering sections of each shock isolation unit and the supporting section of the shock isolation unit face to each other.

2. The shock isolation cushion as claimed in claim 1, wherein a contour of one of the two basal components is designed according to an object loaded on said basal component, and a contour of the other one of the two basal components is designed according to a supporting surface that supports the shock isolation cushion.

3. The shock isolation cushion as claimed in claim 1, wherein each buffering section of each shock isolation unit extending from the supporting section of the shock isolation unit is curved by 90° to 270°.

4. The shock isolation cushion as claimed in claim 3, wherein the at least one shock isolation tier includes two shock isolation tiers respectively distinguished as a first shock isolation tier and a second shock isolation tier.

5. The shock isolation cushion as claimed in claim 3, wherein
the at least two buffering sections of each shock isolation unit include eight buffering sections;
four of the eight buffering sections extend from one of the two opposite ends of the supporting section of the shock isolation unit; and
the other four of the eight buffering sections extend from the other one of the two opposite ends of the supporting section of the shock isolation unit.

6. The shock isolation cushion as claimed in claim 4, wherein
the at least two buffering sections of each shock isolation unit include eight buffering sections;
four of the eight buffering sections extend from one of the two opposite ends of the supporting section of the shock isolation unit; and
the other four of the eight buffering sections extend from the other one of the two opposite ends of the supporting section of the shock isolation unit.

* * * * *